(12) United States Patent
Jan et al.

(10) Patent No.: US 9,085,697 B2
(45) Date of Patent: Jul. 21, 2015

(54) POLYMERIZABLE YELLOW DYE FOR MANUFACTURING OPHTHALMIC LENS

(71) Applicant: BenQ Materials Corporation, Taoyuan County (TW)

(72) Inventors: Fan-Dan Jan, Taoyuan County (TW); Hsia-Hao Chang, Taipei (TW)

(73) Assignee: BENQ MATERIALS CORPORATION, Taoyuan (TW)

( * ) Notice: Subject to any disclaimer, the term of this patent is extended or adjusted under 35 U.S.C. 154(b) by 116 days.

(21) Appl. No.: 13/923,382

(22) Filed: Jun. 21, 2013

(65) Prior Publication Data

US 2014/0378672 A1    Dec. 25, 2014

(51) Int. Cl.
C09B 29/12    (2006.01)

(52) U.S. Cl.
CPC ..................... C09B 29/12 (2013.01)

(58) Field of Classification Search
CPC ....................................... C09B 29/12
USPC ........................................ 534/732
See application file for complete search history.

(56) References Cited

U.S. PATENT DOCUMENTS

| | | | |
|---|---|---|---|
| 3,190,876 A * | 6/1965 | Skoultchi et al. ............ | 534/643 |
| 5,470,932 A | 11/1995 | Jinkerson | |
| 7,098,283 B2 | 8/2006 | Lai | |
| 7,241,312 B2 | 7/2007 | Lai et al. | |

FOREIGN PATENT DOCUMENTS

| CN | 101419301 A | 4/2009 |
|---|---|---|
| CN | 102617784 A | 8/2012 |

OTHER PUBLICATIONS

Nagai et al. (CAPLUS Abstract of: Kogyo Kagaku Zasshi (1966), 69(2), 294-7).*

Patai et al. (CAPLUS Abstract of: Journal of the American Chemical Society (1952), 74, 845-7).*

M. Moniruzzaman et al., "Synthesis and Characterization of an Azobenzene- and Acrylamide-Based Photoresponsive Copolymer and Gel", Journal of Polymer Science: Part A: Polymer Chemistry, vol. 42, 2004, No. 12, pp. 2886-2896.

* cited by examiner

*Primary Examiner* — Robert Havlin
(74) *Attorney, Agent, or Firm* — CKC & Partners Co., Ltd.

(57) ABSTRACT

A polymerizable yellow dye which is used to block or lower the intensity of blue light transmitted through ophthalmic lenses and is represented by the following formula (I):

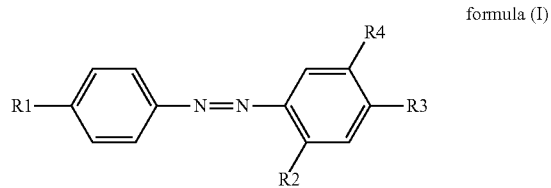

formula (I)

wherein $R_1$ is hydrogen or $-NHCOCH_3$; $R_2$ is hydrogen or $C_1$-$C_3$ alkyl groups; $R_3$ and $R_4$ are independently hydrogen or $-OCO-R_5$, wherein $R_5$ is isopropenyl group or a substituted isopropenyl group represented as $-R_6-(R_7O)_n-COC(CH_3)CH_2$, $R_6$ is NH or

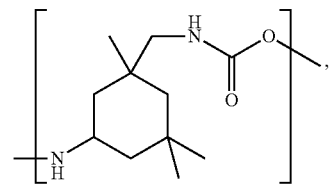

$R_7$ is $C_1$-$C_5$ alkylene groups and n is an integer of 1-40.

9 Claims, No Drawings

POLYMERIZABLE YELLOW DYE FOR MANUFACTURING OPHTHALMIC LENS

BACKGROUND

1. Technical Field

The present invention relates to a polymerizable yellow dye. More particularly, the present invention relates to a polymerizable yellow dye for manufacturing ophthalmic lens which is capable of blocking or lower the intensity of blue light transmitted through ophthalmic lens.

2. Description of Related Art

Solar radiation is one of the primary hazardous factors to human vision. Ultraviolet (UV) light, visible light and IR radiation from the sun is mostly absorbed by the atmosphere. The solar radiation penetrating through the atmosphere and reaching the earth's surface mainly consists of UV-A radiation (wavelength at 300-400 nm), visible light (wavelength at 400-700 nm) and near IR radiation (wavelength at 700-1400 nm). A healthy ocular media of man can block the solar radiation in near IR and most of the visible spectrum to the retina.

In recent years, blue light (wavelength at 400-500 nm) of visible light has been recognized as potentially hazardous to the retina. In the nature, most of blue light is from sun. Moreover, most of electronic products, such as liquid crystal display, light-emitting diode lamp, cell phone panel and computer monitor, have a backlight source with high efficiency of blue light. The blue light can damage the retina and increase the probability of macular degeneration, an irreversible damage to the vision might occur.

In this regard, yellow dyes have been used to block blue light so as to avoid potential damage of the blue light. However, conventional yellow dyes are water-soluble and limited only to the ophthalmic lens made from hydrogel, but cannot be used in the ophthalmic lens made from silicon hydrogel. With the advent of increasing popularity of the ophthalmic lens made from silicon hydrogel, new materials are needed in minimizing or eliminating such risks associated with the exposure of the blue light. Therefore, there is still a need for a novel polymerizable yellow dye for manufacturing ophthalmic lens.

SUMMARY

The present invention is to provide a novel polymerizable yellow dye for manufacturing ophthalmic lens. The polymerizable yellow dye can be used both in hydrogel and silicon hydrogel products which will still maintain good physical properties.

According to an aspect of the present invention, a polymerizable yellow dye for manufacturing ophthalmic lens is provided.

In an embodiment of the present invention, the polymerizable yellow dye is represented by the following formula (I):

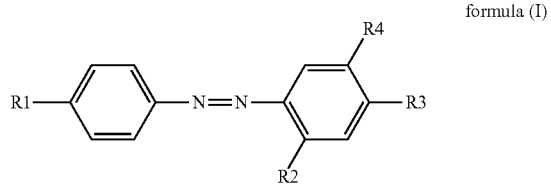

formula (I)

wherein $R_1$ is hydrogen or —NHCOCH$_3$; $R_2$ is hydrogen or $C_1$-$C_3$ alkyl groups; $R_3$ and $R_4$ are independently hydrogen or —OCO—$R_5$, wherein $R_5$ is isopropenyl group or a substituted isopropenyl group represented —$R_6$—($R_7$O)$_n$—COC(CH$_3$)CH$_2$, wherein $R_6$ is NH or

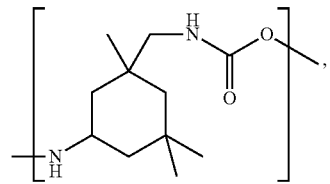

$R_7$ is $C_1$-$C_5$ alkylene groups and n is an integer of 1-40.

In an embodiment of the polymerizable yellow dye for manufacturing ophthalmic lens of the present invention, $R_1$ is hydrogen; $R_2$ is hydrogen; $R_3$ is —OCO—$R_5$, wherein $R_5$ is a substituted isopropenyl group represented as —$R_6$—($R_7$O)$_n$—COC(CH$_3$)CH$_2$, wherein $R_6$ is NH, $R_7$ is —$C_2H_4$—, n is an integer of 1-40; and $R_4$ is hydrogen.

In another embodiment of the polymerizable yellow dye for manufacturing ophthalmic lens of the present invention, $R_1$ is hydrogen; $R_2$ is hydrogen; $R_3$ is —OCO—$R_5$, wherein $R_5$ is isopropenyl; and $R_4$ is hydrogen.

In further another embodiment of the polymerizable yellow dye for manufacturing ophthalmic lens of the present invention, $R_1$ is —NHCOCH$_3$; $R_2$ is methyl; $R_3$ is hydrogen; and $R_4$ is —OCO—$R_5$, wherein $R_5$ is a substituted isopropenyl group represented as —$R_6$—($R_7$O)$_n$—COC(CH$_3$)CH$_2$, wherein $R_6$ is NH, $R_7$ is —$C_2H_4$— and n is an integer of 1-40.

In still another embodiment of the polymerizable yellow dye for manufacturing ophthalmic lens of the present invention, $R_1$ is hydrogen; $R_2$ is hydrogen; $R_3$ is —OCO—$R_5$, wherein $R_5$ is a substituted isopropenyl group represented as —$R_6$—($R_7$O)$_n$—COC(CH$_3$)CH$_2$, $R_6$ is

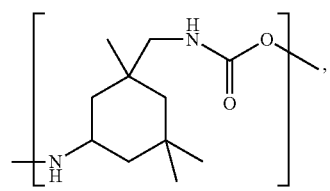

$R_7$ is —$C_2H_4$—, n is an integer of 1-40; and $R_4$ is hydrogen.

In still further another embodiment of the polymerizable yellow dye for manufacturing ophthalmic lens of the present invention, $R_1$ is —NHCOCH$_3$; $R_2$ is methyl; $R_3$ is hydrogen; and $R_4$ is —OCO—$R_5$, wherein $R_5$ is a substituted isopropenyl group represented as —$R_6$—($R_7$O)$_n$—COC(CH$_3$)CH$_2$, wherein $R_6$ is

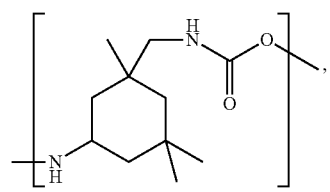

$R_7$ is —$C_2H_4$— and n is an integer of 1-40.

In an embodiment of the present invention, the ophthalmic lens is made from a hydrogel or a silicon hydrogel.

The above and other aspects of the invention will become better understood with regard to the following detailed description of the preferred but non-limiting embodiment(s).

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

According to an aspect of the present invention, a polymerizable yellow dye for manufacturing ophthalmic lens is provided.

In an embodiment of the present invention, the polymerizable yellow dye for manufacturing ophthalmic lens is represented by the following formula (I):

formula (I)

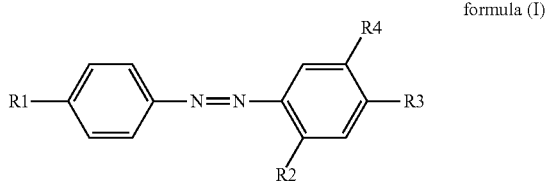

wherein $R_1$ is hydrogen or —$NHCOCH_3$; $R_2$ is hydrogen or $C_1$-$C_3$ alkyl groups; $R_3$ and $R_4$ are independently hydrogen or —OCO—$R_5$, wherein $R_5$ is isopropenyl group or a substituted isopropenyl group represented as —$R_6$—$(R_7O)_n$—$COC(CH_3)CH_2$, wherein $R_6$ is NH or

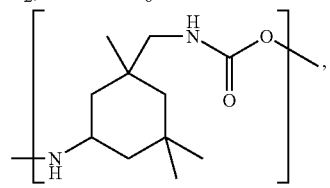

$R_7$ is $C_1$-$C_5$ alkylene groups and n is an integer of 1-40.

In an embodiment of the polymerizable yellow dye for manufacturing ophthalmic lens of the present invention, $R_1$ is hydrogen, $R_2$ is hydrogen, $R_3$ is —OCO—$R_5$, wherein $R_5$ is a substituted isopropenyl group represented as —$R_6$—$(R_7O)_n$—$COC(CH_3)CH_2$, wherein $R_6$ is NH, $R_7$ is n is 1 and $R_4$ is hydrogen as represented by the following formula (II).

formula (II)

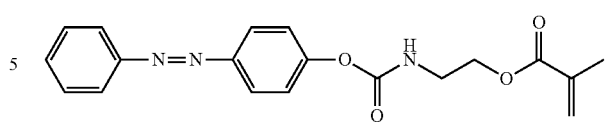

In another embodiment of the polymerizable yellow dye for manufacturing ophthalmic lens of the present invention, wherein $R_1$ is hydrogen; $R_2$ is hydrogen; $R_3$ is —OCO—$R_5$, wherein $R_5$ is isopropenyl group and $R_4$ is hydrogen as represented by the following formula (III):

formula (III)

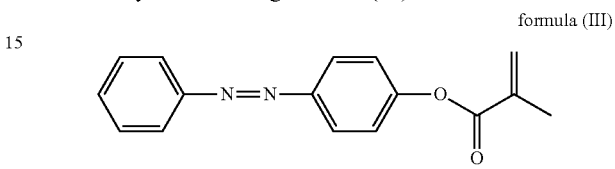

In further another embodiment of the polymerizable yellow dye for manufacturing ophthalmic lens of the present invention, $R_1$ is —$NHCOCH_3$, $R_2$ is methyl, $R_3$ is a hydrogen, $R_4$ is —OCO—$R_5$, wherein $R_5$ is a substituted isopropenyl group represented as —$R_6$—$(R_7O)_n$—$COC(CH_3)CH_2$, wherein $R_6$ is NH, $R_7$ is —$C_2H_4$— and n is 1 as represented by the following formula (IV):

formula (IV)

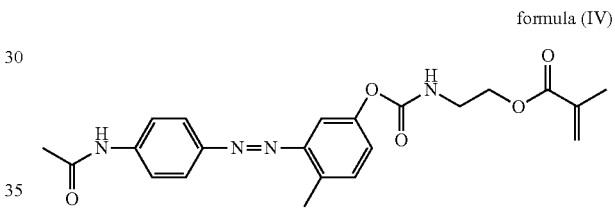

In still another embodiment of the polymerizable yellow dye for manufacturing ophthalmic lens of the present invention, $R_1$ is hydrogen; $R_2$ is hydrogen; $R_3$ is —OCO—$R_5$, wherein $R_5$ is a substituted isopropenyl group represented as —$R_6$—$(R_7O)_n$—$COC(CH_3)CH_2$, $R_6$ is

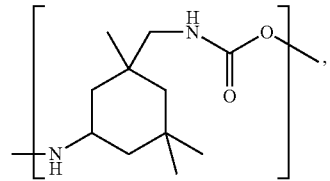

$R_7$ is —$C_2H_4$— and $R_4$ is hydrogen as represented by the following formula (V):

formula (V)

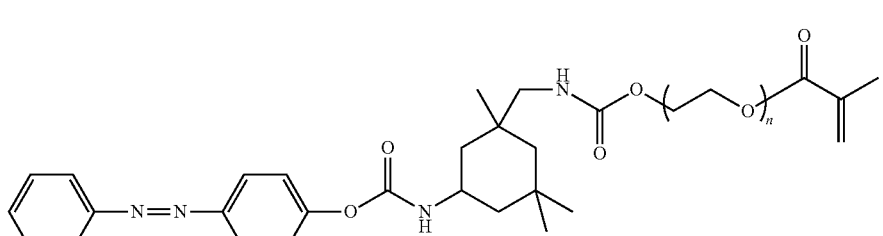

wherein n is an integer of 1-40.

In still further another embodiment of the polymerizable yellow dye for manufacturing ophthalmic lens of the present invention, $R_1$ is —NHCOCH$_3$, $R_2$ is methyl, $R_3$ is hydrogen, $R_4$ is —OCO—$R_5$, wherein $R_5$ is a substituted isopropenyl group represented as —$R_6$—($R_7$O)$_n$—COC(CH$_3$)CH$_2$, wherein $R_6$ is

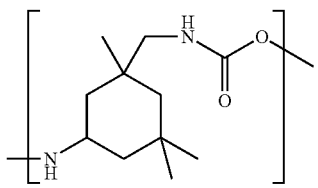

and $R_7$ is —C$_2$H$_4$— as represented by the following formula (VI):

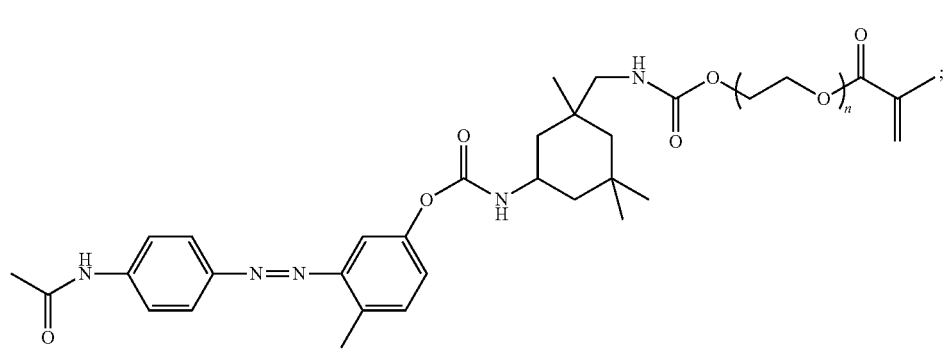

wherein n is an integer of 1-40.

The polymerizable yellow dyes of the present invention may be incorporated into a number of materials for a variety of applications where it is desirable to block blue light (wave length approximately at 400-500 nm). Such applications may include, for example, contact lenses, intraocular lens, eyeglasses and sunglasses. A preferred application is the use of yellow polymerizable dyes in contact lenses.

The blue-blocking contact lenses of this invention may be made by co-polymerizing one or more lens-forming materials with one or more polymerizable yellow dyes. In a preferred embodiment, these materials are cured directly in a polypropylene mold so that a finished optic is produced. The time and method for curing vary with the particular lens-forming material chosen.

In an embodiment of the present invention, the total amount of the polymerizable yellow dye is present from 0.25 to 5 wt %, and more preferably from 0.75 to 3 wt % based on the total weight of the materials of ophthalmic lens.

In an embodiment of the materials of ophthalmic lens of the present invention, the materials of ophthalmic lens comprises but not limited to a hydrophilic monomer, a crosslinking agent and an initiator.

The suitable hydrophilic monomer can be but not limited to N-vinylpyrrolidone (NVP), 2-hydroxyethyl methacrylate (HEMA), N,N'-dimethylacrylamide (DMA), methyl acrylic acid (MAA), N,N-diethylacrylamide, N-isopropylacrylamide, 2-hydroxyethyl acrylate, vinyl acetate, N-acryloylmorpholine, 2-dimethylamino acrylate and a combination thereof. In an embodiment of the present invention, the hydrophilic monomer is a combination of N-vinylpyrrolidone (NVP), 2-hydroxyethyl methacrylate (HEMA) and methyl acrylic acid (MAA).

The initiator suitably used in conventional materials for contact lens can be used in the present invention. The initiator can be a photoinitiator or a thermal initiator. The suitable thermal initiator can be but not limited to, such as for example, azobisisoheptonitrile (ADVN), azobisisobutyronitrile (AIBN), 2,2'-azobis(2,4-dimethylvaleronitrile), 2,2'-azobis(2-methyl-propanenitrile), 2,2'-azobis(2-methyl-butanenitrile) or benzoyl peroxide. The suitable photoinitiator can be but not limited to, such as, for example, 2,4,6-trimethylbenzoyl diphenyl oxide, 2-hydroxy-2-methylphenylpropane-1-one, ethyl (2,4,6-trimethylbenzoyl) phenylphosphinate or 2,2-diethoxyacetophenone.

The suitable crosslinking agent can be but not limited to, such as, for example, ethylene glycol dimethacrylate (EGDMA), trimethylolpropane triacrylate (TMPTA), tetraethylene ethylene glycol dimethacrylate (TEGDMA), tetraethylene ethylene glycol dimethacrylate (TrEGDMA), Poly(ethylene glycol) dimethacrylate, trimethylolpropane trimethacrylate, vinyl methacrylate, ethylenediamine dimethyl acrylamide, glycerol dimethacrylate, triallyl isocyanurate and triallyl cyanurate.

In another embodiment of the materials of ophthalmic lens of the present invention, the materials of ophthalmic lens comprises but not limited to at least one siloxane macromer, a hydrophilic monomer and an initiator.

The siloxane macromer can comprises but not limited to a first siloxane macromer represented by the following formula (A):

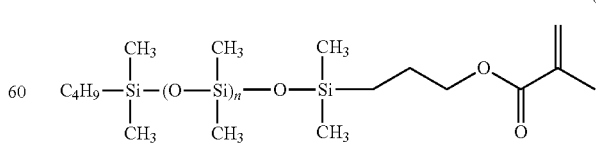

wherein, in formula (A), n is an integer of 0 to 60; and a second siloxane macromer represented by the following formula (B):

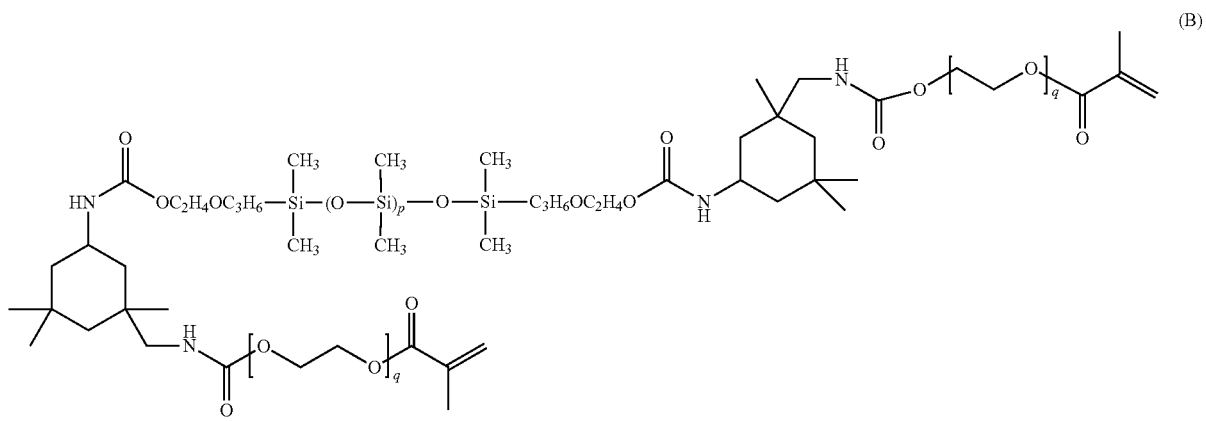

wherein, in formula (B), p is an integer of 4-80 and q is an integer of 3-40.

Suitable hydrophilic monomer and initiator are mentioned as above.

In addition, the materials of ophthalmic lens can further comprise but not limited to a crosslinking agent, a dye, an UV-blocking agent, a solvent or a combination thereof. The suitable solvent can be but not limited to, such as, for example, ethanol or 1-hexanol.

The present invention will be explained in further detail with reference to the examples. However, the present invention is not limited to these examples.

EXAMPLE

Example 1

Preparation of Yellow Dye (I)

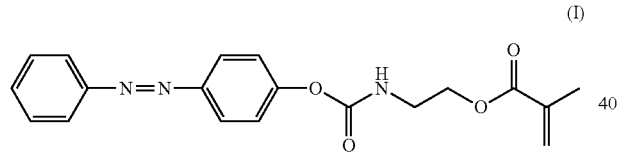

(I)

2.5 g of 4-hydroxyazobenzene and 40 mL of methylene chloride were added to a flask under a stream of nitrogen. Then, 0.002 g of dibutyltin dilaurate and 2 g of 2-isocyanatoethyl methacrylate were accurately weighed and added to the solution. After stirred for about 5 hours, the resulting reaction product was washed with water, and then dehydrated, filtered and removed methylene chloride to obtain a Yellow dye (I).

The results of analysis of $^1$H-NMR exhibited are as follows:

$^1$H-NMR (400 MHz, CDCl$_3$): δ 7.93-7.84 (m, 4H), 7.51-7.43 (m, 3H), 7.28-7.24 (m 2H), 6.29 (s, 1H), 5.62 (s, 1H), 5.37 (1H, NH), 4.31 (m, 2H), 3.62 (2H), 1.97 (s, 3H).

Example 2

Preparation of Yellow Dye (II)

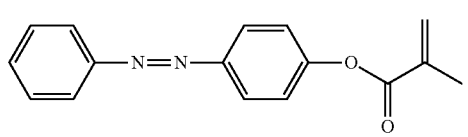

(II)

2 g of 4-hydroxyazobenzene, 1.6 g of methacrylic acid, 2.36 g of 1-ethyl-3-(3-dimethylaminopropyl) carbodiimide, 0.15 g of 4-dimethylaminopyridine and 30 mL of methylene chloride were added to a flask. After stirred for about 12 hours. 20 mL of water was added to extract, and the organic layer was collected. The resulting reaction product was dehydrated and filtered, and then methylene chloride was removed to obtain a Yellow dye (II).

The results of analysis of $^1$H-NMR exhibited are as follows:

$^1$H-NMR (400 MHz, CDCl$_3$): δ 7.88 (m, 4H), 7.43 (m, 3H), 7.20 (m, 2H), 6.31 (s, 1H), 5.72 (s, 1H), 2.01 (s, 3H),

Example 3

Preparation of Yellow Dye (III)

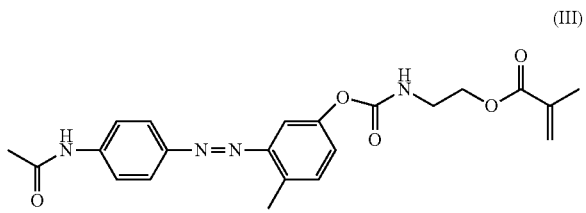 [SMILES: C=C(C)C(=O)OCCNC(=O)Oc1ccc(C)c(N=Nc2ccc(NC(C)=O)cc2)c1]

(III)

1 g of Disperse Yellow 3 and 40 mL of methylene chloride were added to a flask under a stream of nitrogen. Then, 0.001 g of dibutyltin dilaurate and 0.6 g of 2-isocyanatoethyl methacrylate were accurately weighed and added to the solution. After stirred for about 5 hours, the resulting reaction product was washed with water, and then dehydrated, filtered and removed methylene chloride to obtain a Yellow dye (III).

The results of analysis of $^1$H-NMR exhibited are as follows:

$^1$H-NMR (400 MHz, CDCl$_3$): δ 7.93-7.84 (m, 4H), 7.51-7.43 (m, 3H), 7.28-7.24 (m, 2H), 6.29 (s, 1H), 5.62 (s, 1H), 5.37 (1H, NH), 4.31 (m, 2H), 3.62 (m, 2H), 1.97 (s, 3H).

Example 4

Preparation of Yellow Dye (IV)

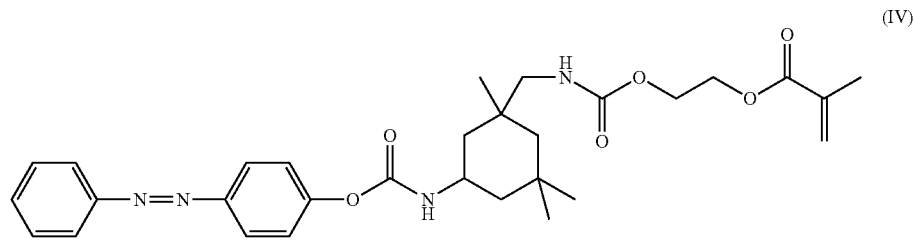 [SMILES: C=C(C)C(=O)OCCOC(=O)NCC1(C)CC(NC(=O)Oc2ccc(N=Nc3ccccc3)cc2)CC(C)(C)C1]

The reaction scheme of Yellow dye (IV) is shown as follow:

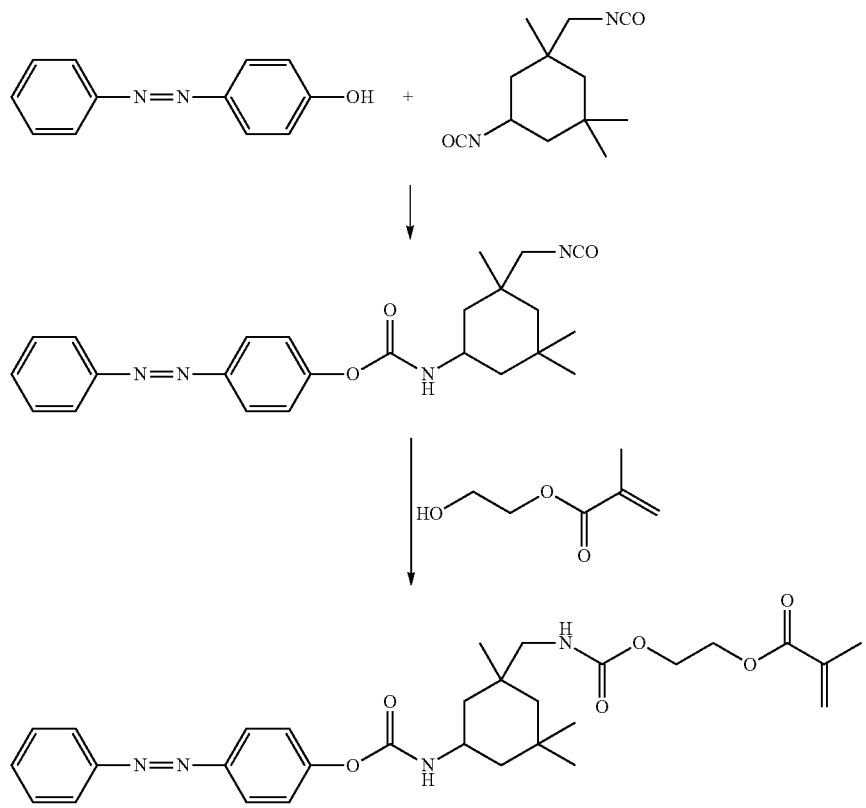

1.12 g of isophorone diisocyanate, 0.0005 g of dibutyltin dilaurate and 40 mL of methylene chloride were added to a flask, and the solution was stirred under a stream of nitrogen. Then, 1 g of hydroxyazophenol was accurately weighed and added dropwise to the solution over about 20 minutes. After reaction standing for about 6 hours, 0.0005 g of dibutyltin dilaurate and 0.65 g of hydroxyethyl methacrylate were added to the solution. After stirred for about 6 hours, the resulting reaction product was washed with water, and then dehydrated, filtered and removed methylene chloride to obtain a Yellow dye (IV).

Example 5

Preparation of Yellow Dye (V)

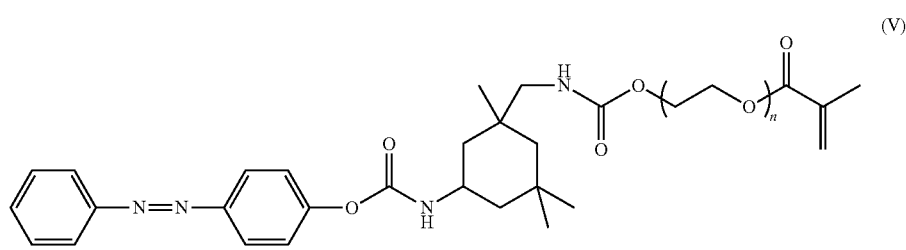

The reaction scheme of Yellow dye (V) is shown as follow:

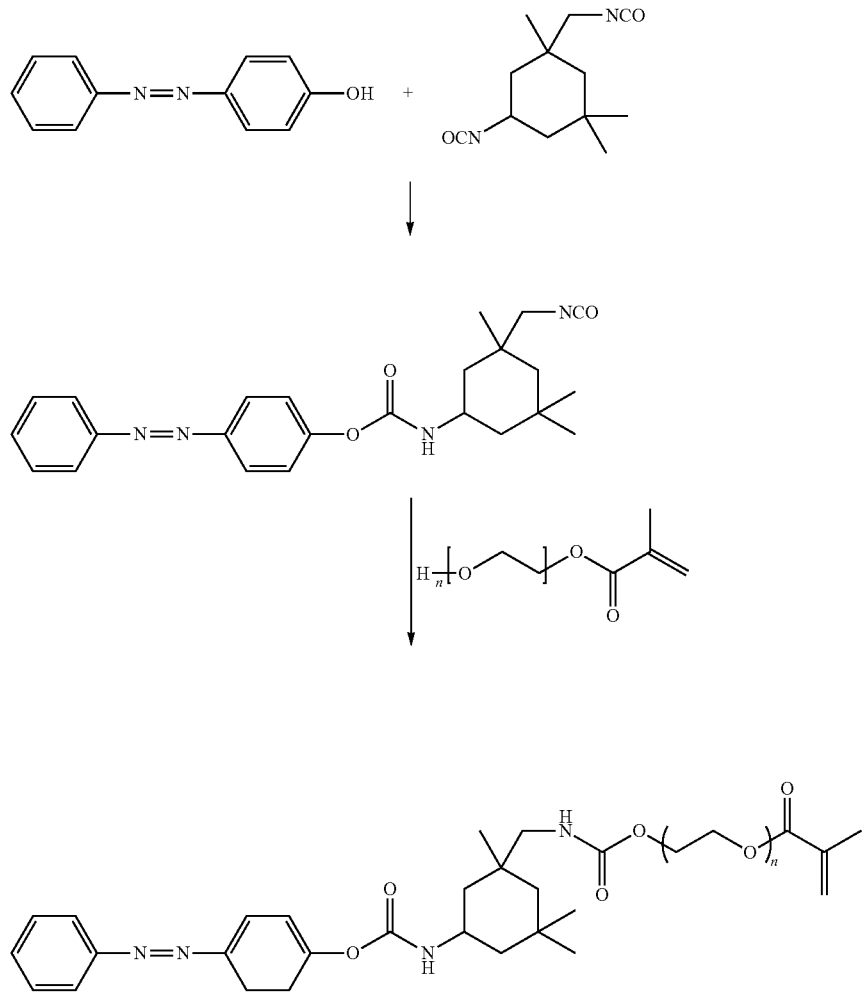

1.12 g of isophorone diisocyanate, 0.00059 of dibutyltin dilaurate and 40 mL of methylene chloride were added to a flask, and the solution was stirred under a stream of nitrogen. Then, 1 g of hydroxyazophenol was accurately weighed and added dropwise to the solution over about 20 minutes. After reaction standing for about 6 hours, 0.0005 g of dibutyltin dilaurate and 1.8 g of polyethylene glycol methacrylate (Mn: 360) were added to the solution. After stirred for about 6 hours, the resulting reaction product was washed with water, and then dehydrated, filtered and removed methylene chloride to obtain a Yellow dye (V), and the number average molecular weight of Yellow dye (V) was about 800.

Example 6

Preparation of Yellow Dye (VI)

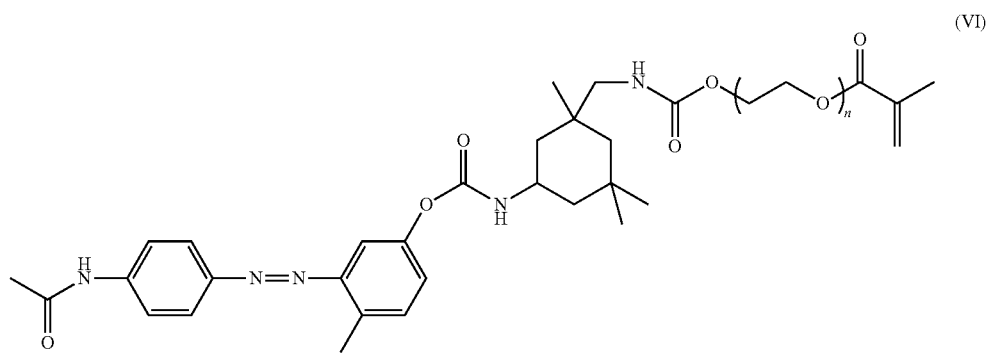

The reaction scheme of Yellow dye (VI) is shown as follow

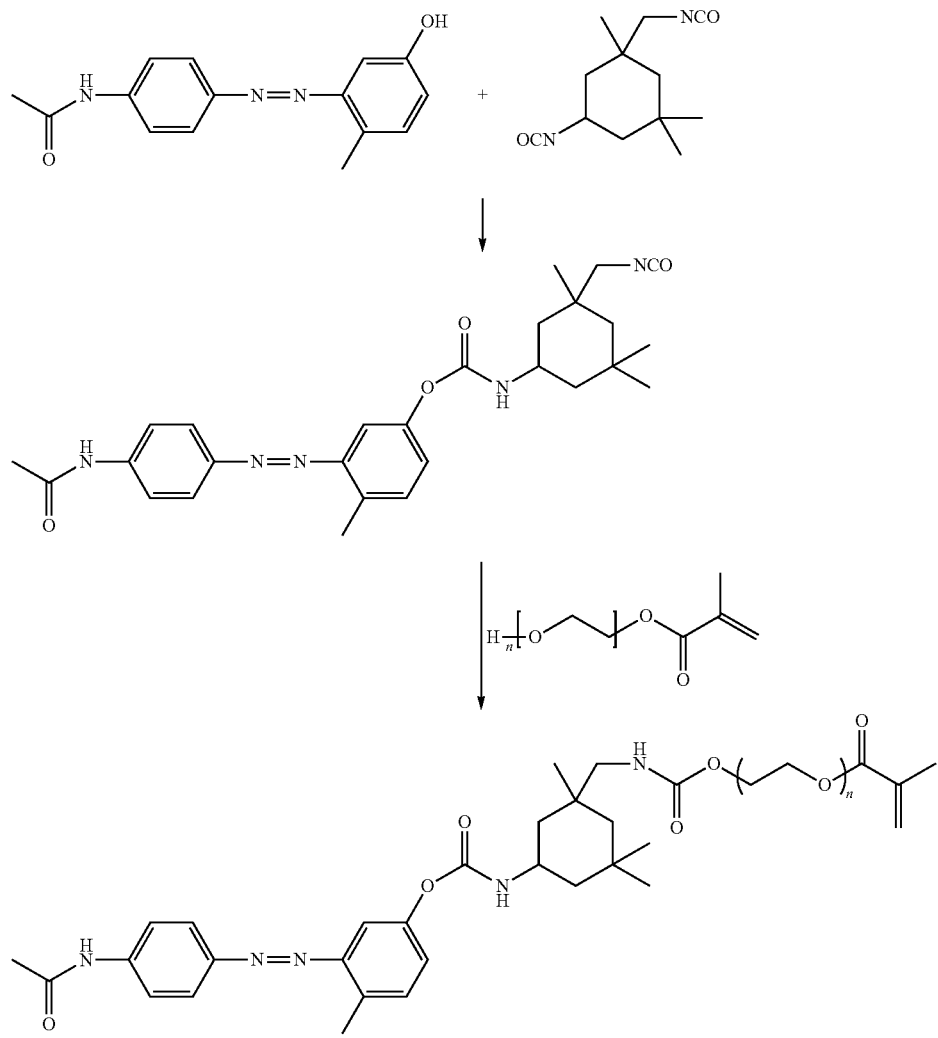

1 g of isophorone diisocyanate, 0.0005 g of dibutyltin dilaurate and 40 mL of methylene chloride were added to a flask, and the solution was stirred under a stream of nitrogen. Then, 1 g of Disperse yellow 3 was accurately weighed and added dropwise to the solution over about 20 minutes. After reaction standing for about 6 hours, 0.0005 g of dibutyltin dilaurate and 1.3 g of polyethylene glycol methacrylate (Mn: 360) were added to the solution. After stirred for about 12 hours, the resulting reaction product was washed with water, and then dehydrated, filtered and removed methylene chloride to obtain a Yellow dye (VI) and the number average molecular weight of Yellow dye (VI) was about 850.

Example 7

Preparations of Siloxane Macromer (A) and Siloxane Macromer (B)

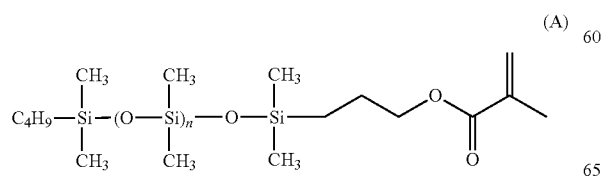

(A)

The siloxane macromer (A) (Mn: 1,000) is commercially available from to MCR-M11, Gelest.

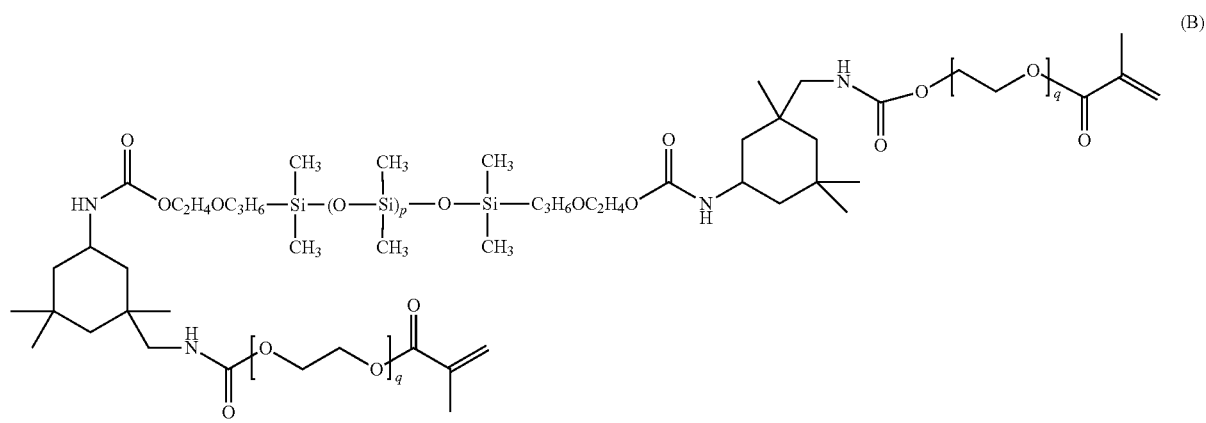

The reaction scheme of second siloxane macromer (B) is shown as follow:

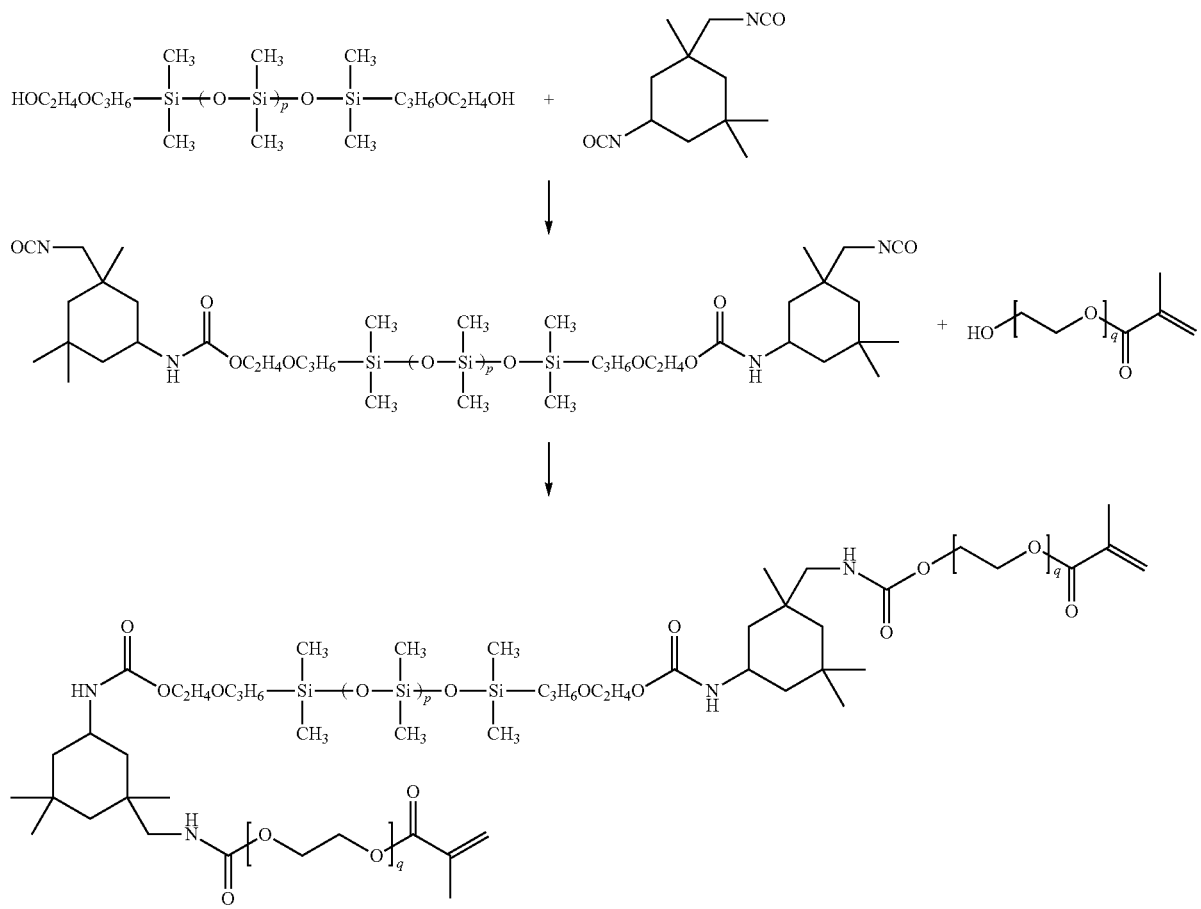

8.88 g of isophorone diisocyanate, 0.0025 g of dibutyltin dilaurate as the catalyst, and 40 mL of methylene chloride were added to a flask, and the solution was stirred under a stream of nitrogen. Then, 20 g of monocarbinol terminated polydimethylsiloxane (Mn. was about 3,000, available from Gelest) was accurately weighed and added dropwise to the solution over about 1 hour. After the reaction at room temperature for 12 hours, another 0.0025 g of dibutyltin dilaurate and 14.4 g of polyethylene glycol monomethacrylate (Mn was about 360) were accurately weighed and added dropwise to the solution over about 1 hour. After the reaction standing at room temperature for another 12 hours, the resulting reaction product was washed with a large amount of water, and then dehydrated and filtered to obtain a raw product. Then, the methylene chloride was evaporated to obtain a siloxane macromer (B) and the number average molecular weight of siloxane macromer (B) was about 4,500.

Preparation of Contact Lens

Examples 8-10

The Preparation of the Hydrogel Contact Lens Containing Yellow Dye (I)

Yellow dye (I), N-vinylpyrrolidone (NVP), 2-hydroxyethyl methacrylate (HEMA), methacrylic acid (MAA), an ethylene glycol dimethacrylate (EGDMA) as crosslinking agent and an azobisisobutyronitrile (AIBN) as thermal initiator were mixed at the amounts shown in following Table 1 and stirred about 1 hour to form a mixture.

TABLE 1

The composition of contact lens of Example 8-Example 10

| | | Example (wt %) | | |
|---|---|---|---|---|
| Function | Composition | 8 | 9 | 10 |
| Yellow dye | Yellow dye (I) | 0.75 | 1.5 | 3 |
| Hydrophilic monomer | NVP | 9.7 | 9.7 | 9.7 |
| | HEMA | 75.5 | 75.5 | 75.5 |
| | MAA | 13.5 | 13.5 | 13.5 |
| Crosslinking agent | EGDMA | 0.7 | 0.7 | 0.7 |
| Initiator | AIBN | 0.6 | 0.6 | 0.6 |

Then, the mixtures were injected into a mold of contact lens made of polypropylene (PP) and heated to initiate the radical polymerization thereof at 80° C. for 10 hours. After the polymerization was completed, the mold with lens was immersed in ethanol for 1 hour, and then the resulting molded lens was taken out of the mold. After that, the resulting lens was immersed in heated water for 4 hours, and then immersed in a buffer solution to reach equilibrium.

The blue light blocking rates of examples were obtained by analyzing a spectrum measured by ultraviolet-visible spectroscopy V-650 (available from JASCO, Japan).

The results of physical property tests of Example 8-Example 10 of the present invention were shown as the following Table 2.

TABLE 2

The result of physical property tests of Example 8-Example 10

| | Example | | |
|---|---|---|---|
| Item | 8 | 9 | 10 |
| Water content (%) | 43.1 | 41 | 45.1 |
| Modulus (MPa) | 0.41 | 0.35 | 0.38 |
| Tension (g) | 137.1 | 91.8 | 100 |
| Oxygen permeability (Dk) | 10.3 | 8.5 | 11 |
| Blocking rate (%) | 38 | 65 | 70 |

Examples 11-12

The Preparation of the Silicon Hydrogel Contact Lens Containing Yellow Dye (I)

A siloxane macrome (A), a siloxane macrome (B), Yellow dye (I), N,N'-dimethylacrylamide (DMA), 2-hydroxyethyl methacrylate (HEMA), an azobisisobutyronitrile (AIBN) as thermal initiator and an ethanol as solvent were mixed at the amounts shown in following Table 3 and stirred about 1 hour to form a mixture.

TABLE 3

The composition of contact lens of Example 11-Example 12

| | | Example (wt %) | |
|---|---|---|---|
| Function | Composition | 11 | 12 |
| Yellow dye | Yellow dye (I) | 0.75 | 1.5 |
| Siloxane macrome | Siloxane macrome (A) | 35 | 40.5 |
| | Siloxane macrome (B) | 14 | 16.2 |
| Hydrophilic monomer | DMA | 25.4 | 16.1 |
| | HEMA | 24.9 | 26.5 |
| Initiator | AIBN | 0.7 | 0.7 |
| Solvent | Ethanol | 20 | 20 |

Then, the mixtures were injected into a mold of contact lens made of polypropylene (PP) and heated to initiate the radical polymerization thereof at 80° C. for 10 hours. After the polymerization was completed, the mold with lens was immersed in ethanol for 1 hour, and then the resulting molded lens was taken out of the mold. After that, the resulting lens was immersed in heated water for 4 hours, and then immersed in a buffer solution to reach equilibrium.

The blue light blocking rates of examples were obtained by analyzing a spectrum measured by ultraviolet-visible spectroscopy V-650 (available from JASCO, Japan).

The results of physical property tests of Example 11-Example 12 of the present invention were shown as the following Table 4.

TABLE 4

The result of physical property tests of Example 11-Example 12

| | Example | |
|---|---|---|
| Item | 11 | 12 |
| Water content (%) | 38.8 | 42.9 |
| Modulus (MPa) | 0.53 | 1.03 |
| Tension (g) | 49 | 67 |
| Oxygen permeability (Dk) | 93 | 56 |
| Blocking rate (%) | 23 | 63 |

Examples 13-14

The Preparation of the Silicon Hydrogel Contact Lens Containing Yellow Dye (II)

A siloxane macrome (A), a siloxane macrome (B), Yellow dye (II), N,N'-dimethylacrylamide (DMA), 2-hydroxyethyl methacrylate (HEMA), an azobisisobutyronitrile (AIM) as thermal initiator and an ethanol as solvent were mixed at the amounts shown in following Table 5 and stirred about 1 hour to form a mixture.

TABLE 5

The composition of contact lens of Example 13-Example 14

| | | Example (wt %) | |
|---|---|---|---|
| Function | Composition | 13 | 14 |
| Yellow dye | Yellow dye (II) | 1.5 | 1.5 |
| Siloxane macrome | Siloxane macrome (A) | 40.5 | 30.5 |
| | Siloxane macrome (B) | 16.2 | 26.2 |

TABLE 5-continued

The composition of contact lens of Example 13-Example 14

| | | Example (wt %) | |
|---|---|---|---|
| Function | Composition | 13 | 14 |
| Hydrophilic monomer | DMA | 16.1 | 25 |
| | HEMA | 26.5 | 26.6 |
| Initiator | AIBN | 0.7 | 0.7 |
| Solvent | Ethanol | 20 | 20 |

Then, the mixtures were injected into a mold of contact lens made of polypropylene (PP) and heated to initiate the radical polymerization thereof at 80° C. for 10 hours. After the polymerization was completed, the mold with lens was immersed in ethanol for 1 hour, and then the resulting molded lens was taken out of the mold. After that, the resulting lens was immersed in heated water for 4 hours, and then immersed in a buffer solution to reach equilibrium.

The blue light blocking rates of examples were obtained by analyzing a spectrum measured by ultraviolet-visible spectroscopy V-650 (available from JASCO, Japan).

The results of physical property tests of Example 13-Example 14 of the present invention were shown as the following Table 6.

TABLE 6

The result of physical property tests of Example 13-Example 14

| | Example | |
|---|---|---|
| Item | 13 | 14 |
| Water content (%) | 44.1 | 42 |
| Modulus (MPa) | 0.63 | 0.39 |
| Tension (g) | 81 | 41 |
| Oxygen permeability (Dk) | 61 | 64 |
| Blocking rate (%) | 65 | 65 |

Examples 15-16

The Preparation of the Silicon Hydrogel Contact Lens Containing Yellow Dye (III)

A siloxane macrome (A), a siloxane macrome (B), Yellow dye (III), N,N'-dimethylacrylamide (DMA), 2-hydroxyethyl methacrylate (HEMA), an azobisisobutyronitrile (AIBN) as thermal initiator and an ethanol as solvent were mixed at the amounts shown in following Table 7 and stirred about 1 hour to form a mixture.

TABLE 7

The composition of contact lens of Example 15-Example 16

| | | Example (wt %) | |
|---|---|---|---|
| Function | Composition | 15 | 16 |
| Yellow dye | Yellow dye (III) | 1.5 | 3 |
| Siloxane macrome | Siloxane macrome (A) | 40.5 | 30.5 |
| | Siloxane macrome (B) | 16.2 | 26.2 |
| Hydrophilic monomer | DMA | 16.1 | 26.5 |
| | HEMA | 26.5 | 16.1 |
| Initiator | AIBN | 0.7 | 0.7 |
| Solvent | Ethanol | 20 | 20 |

Then, the mixtures were injected into a mold of contact lens made of polypropylene (PP) and heated to initiate the radical polymerization thereof at 80° C. for 10 hours. After the polymerization was completed, the mold with lens was immersed in ethanol for 1 hour, and then the resulting molded lens was taken out of the mold. After that, the resulting lens was immersed in heated water for 4 hours, and then immersed in a buffer solution to reach equilibrium.

The blue light blocking rates of examples were obtained by analyzing a spectrum measured by ultraviolet-visible spectroscopy V-650 (available from JASCO, Japan).

The results of physical property tests of Example 15-Example 16 of the present invention were shown as the following Table 8.

TABLE 8

The result of physical property tests of Example 15-Example 16

| | Example | |
|---|---|---|
| Item | 15 | 16 |
| Water content (%) | 44.1 | 35.5 |
| Modulus (MPa) | 0.57 | 0.77 |
| Tension (g) | 73 | 58 |
| Oxygen permeability (Dk) | 50 | 63 |
| Stocking rate (%) | 61 | 62 |

Examples 17-20

The Preparation of the Silicon Hydrogel Contact Lens Containing Yellow Dye (IV)

A siloxane macrome (A), a siloxane macrome (B), Yellow dye V), N,N'-dimethylacrylamide (DMA), 2-hydroxyethyl methacrylate (HEMA), an azobisisobutyronitrile (AIBN) as thermal initiator and an ethanol as solvent were mixed at the amounts shown in following Table 9 and stirred about 1 hour to form a mixture.

TABLE 9

The composition of contact lens of Example 17-Example 20

| | | Example (wt %) | | | |
|---|---|---|---|---|---|
| Function | Composition | 17 | 18 | 19 | 20 |
| Yellow dye | Yellow dye (IV) | 0.75 | 1.5 | 3 | 5 |
| Siloxane macrome | Siloxane macrome (A) | 35 | 40.5 | 40.5 | 40.5 |
| | Siloxane macrome (B) | 14 | 16.2 | 16.2 | 16.2 |
| Hydrophilic monomer | DMA | 25.4 | 16.1 | 16.1 | 16.1 |
| | HEMA | 24.9 | 26.5 | 26.5 | 26.5 |
| Initiator | AIBN | 0.7 | 0.7 | 0.7 | 0.7 |
| Solvent | Ethanol | 20 | 20 | 20 | 20 |

Then, the mixtures were injected into a mold of contact lens made of polypropylene (PP) and heated to initiate the radical polymerization thereof at 80° C. for 10 hours. After the polymerization was completed, the mold with lens was immersed in ethanol for 1 hour, and then the resulting molded lens was taken out of the mold. After that, the resulting lens was immersed in heated water for 4 hours, and then immersed in a buffer solution to reach equilibrium.

The blue light blocking rates of examples were obtained by analyzing a spectrum measured by ultraviolet-visible spectroscopy V-650 (available from JASCO, Japan).

The results of physical property tests of Example 17-Example 20 of the present invention were shown as the following Table 10.

TABLE 10

The result of physical property tests of Example 17-Example 20

| Item | Example 17 | Example 18 | Example 19 | Example 20 |
|---|---|---|---|---|
| Water content (%) | 43.5 | 42.2 | 36.3 | 43.3 |
| Modulus (MPa) | 0.57 | 0.64 | 0.61 | 0.65 |
| Tension (g) | 91 | 74 | 45 | 42 |
| Oxygen permeability (Dk) | 58 | 62 | 61 | 64 |
| Blocking rate (%) | 20 | 33 | 59 | 76 |

Example 21

The Preparation of the Silicon Hydrogel Contact Lens Containing Yellow Dye (V)

A siloxane macrome (A), a siloxane macrome (B), Yellow dye (V), N,N'-dimethylacrylamide (DMA), 2-hydroxyethyl methacrylate (HEMA), an azobisisobutyronitrile (AIBN) as thermal initiator and an ethanol as solvent were mixed at the amounts shown in following Table 11 and stirred about 1 hour to form a mixture.

TABLE 11

The composition of contact lens of Example 21

| Function | Composition | Example (wt %) 21 |
|---|---|---|
| Yellow dye | Yellow dye (V) | 1.5 |
| Siloxane macrome | Siloxane macrome (A) | 40.5 |
| | Siloxane macrome (B) | 16.2 |
| Hydrophilic monomer | DMA | 16.1 |
| | HEMA | 26.5 |
| Initiator | AIBN | 0.7 |
| Solvent | Ethanol | 20 |

Then, the mixtures were injected into a mold of contact lens made of polypropylene (PP) and heated to initiate the radical polymerization thereof at 80° C. for 10 hours. After the polymerization was completed, the mold with lens was immersed in ethanol for 1 hour, and then the resulting molded lens was taken out of the mold. After that, the resulting lens was immersed in heated water for 4 hours, and then immersed in a buffer solution to reach equilibrium.

The blue light blocking rate of example was obtained by analyzing a spectrum measured by ultraviolet-visible spectroscopy V-650 (available from JASCO, Japan).

The results of physical property tests of Example 21 of the present invention were shown as the following Table 12.

TABLE 12

The result of physical property tests of Example 21

| Item | Example 21 |
|---|---|
| Water content (%) | 36.4 |
| Modulus (MPa) | 0.63 |
| Tension (g) | 54 |
| Oxygen permeability (Dk) | 66 |
| Blocking rate (%) | 60 |

Example 22

The Preparation of the Silicon Hydrogel Contact Lens Containing Yellow Dye (VI)

A siloxane macrome (A), a siloxane macrome (B), Yellow dye (VI), N,N'-dimethylacrylamide (DMA), 2-hydroxyethyl methacrylate (HEMA), an azobisisobutyronitrile (AIBN) as thermal initiator and an ethanol as solvent were mixed at the amounts shown in following Table 12 and stirred about 1 hour to form a mixture.

TABLE 12

The composition of contact lens of Example 22

| Function | Composition | Example (wt %) 22 |
|---|---|---|
| Yellow dye | Yellow dye (VI) | 1.5 |
| Siloxane macrome | Siloxane macrome (A) | 40.5 |
| | Siloxane macrome (B) | 16.2 |
| Hydrophilic monomer | DMA | 16.1 |
| | HEMA | 26.5 |
| Initiator | AIBN | 0.7 |
| Solvent | Ethanol | 20 |

Then, the mixtures were injected into a mold of contact lens made of polypropylene (PP) and heated to initiate the radical polymerization thereof at 80° C. for 10 hours. After the polymerization was completed, the mold with lens was immersed in ethanol for 1 hour, and then the resulting molded lens was taken out of the mold. After that, the resulting lens was immersed in heated water for 4 hours, and then immersed in a buffer solution to reach equilibrium.

The blue light blocking rate of example was obtained by analyzing a spectrum measured by ultraviolet-visible spectroscopy V-650 (available from JASCO, Japan).

The results of physical property tests of Example 22 of the present invention were shown as the following Table 14.

TABLE 14

The result of physical property tests of Example 22

| Item | Example 22 |
|---|---|
| Water content (%) | 44.9 |
| Modulus (MPa) | 0.54 |
| Tension (g) | 65 |
| Oxygen permeability (Dk) | 61 |
| Blocking rate (%) | 70 |

As shown in Table 1-14, the contact lens according to the present invention has excellent blue light blocking rate. In the examples of hydrogel, the water content is about 41-45%, the modulus is about 0.35-0.41 MPa, the tension is about 90-140, and the oxygen permeability (Dk) is about 9-11. In addition, in the examples of silicon hydrogel, the water content is about 35-45%, the modulus is about 0.5-1.03 MPa, the tension is about 41-91, and the oxygen permeability (Dk) is about 50-93. Both hydrogel and silicon hydrogel ophthalmic lenses maintain good physical properties.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A polymerizable yellow dye for manufacturing ophthalmic lens, the polymerizable yellow dye being represented by the following formula (I):

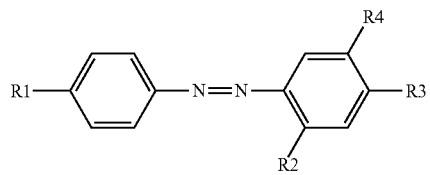

formula (I)

wherein $R_1$ is hydrogen or —NHCOCH$_3$; $R_2$ is hydrogen or $C_1$-$C_3$ alkyl groups; $R_3$ and $R_4$ are independently hydrogen or

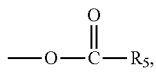

and one of $R_3$ and $R_4$ is

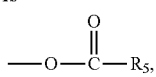

wherein $R_5$ is represented as

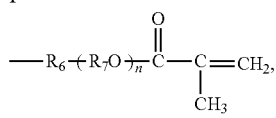

wherein $R_6$ is NH or

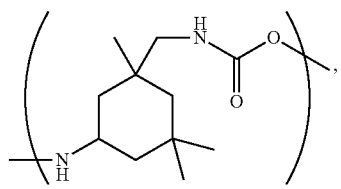

$R_7$ is $C_1$-$C_5$ alkylene groups and n is an integer of 1-40.

2. The polymerizable yellow dye according to claim 1, wherein in the formula (I), $R_1$ is hydrogen; $R_2$ is hydrogen; $R_3$ is

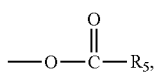

wherein $R_5$ is

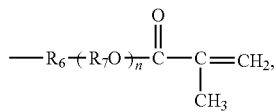

wherein $R_6$ is NH, $R_7$ is n is an integer of 1-40; and $R_4$ is hydrogen.

3. The polymerizable yellow dye according to claim 1, wherein in the formula (I), $R_1$ is —NHCOCH$_3$; $R_2$ is methyl; $R_3$ is hydrogen; $R_4$ is

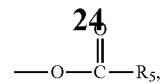

wherein $R_5$ is

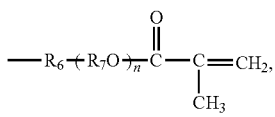

wherein $R_6$ is NH, $R_7$ is —C$_2$H$_4$— and n is an integer of 1-40.

4. The polymerizable yellow dye according to claim 1, wherein in the formula (I), $R_1$ is hydrogen; $R_2$ is hydrogen; $R_3$ is

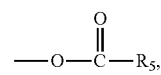

wherein $R_5$ is

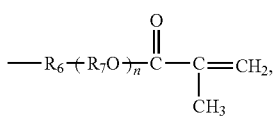

wherein $R_6$ is

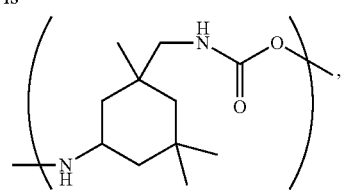

$R_7$ is —C$_2$H$_4$—, n is an integer of 1-40; and $R_4$ is hydrogen.

5. The polymerizable yellow dye according to claim 1, wherein in the formula (I), $R_1$ is —NHCOCH$_3$; $R_2$ is methyl; $R_3$ is hydrogen; $R_4$ is

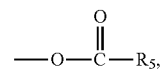

wherein $R_5$ is

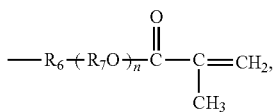

wherein $R_6$ is

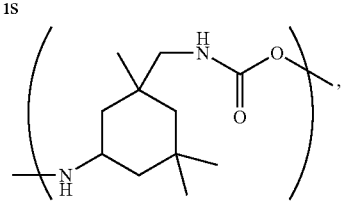

$R_7$ is —C$_2$H$_4$— and n is an integer of 1-40.

6. An ophthalmic lens comprising the polymerizable yellow dye according to claim 1, wherein the total amount of the polymerizable yellow dye is present from 0.25 to 5 wt % based on the total weight of the ophthalmic lens.

7. The ophthalmic lens according to claim 6, wherein the total amount of the polymerizable yellow dye is present from 0.75 to 3 wt % based on the total weight of the ophthalmic lens.

8. The ophthalmic lens according to claim 6, wherein the ophthalmic lens is made from a hydrogel or a silicon hydrogel.

9. The ophthalmic lens according to claim 6, wherein the ophthalmic lens is intraocular lenses (IOLs) or contact lenses.

* * * * *